United States Patent

Uhlending et al.

[11] Patent Number: 6,062,011
[45] Date of Patent: May 16, 2000

[54] CONVEYING DEVICE FOR HARVESTING MACHINE

[75] Inventors: Hubert Uhlending, Dulmen; Ludger Gausmann, Hagen; Hubert Buhne, Sendenhorst; Andreas Arnold, Bielefeld; Uwe Amsbeck, Harsewinkel, all of Germany

[73] Assignee: Claas Selbstfahrende Erntemaschinen GmbH, Harsewinkel, Germany

[21] Appl. No.: 09/267,763

[22] Filed: Mar. 13, 1999

[30] Foreign Application Priority Data

Mar. 17, 1998 [DE] Germany .......................... 198 11 449

[51] Int. Cl.[7] ............................. A01D 45/02; A01D 43/00
[52] U.S. Cl. ................................... 56/119; 56/153; 56/84; 56/94
[58] Field of Search .............................. 56/119, 500, 503, 56/94, 84, 16.4 A, 16.4 B, 16.4 R, 10.4, 400.2, 400.1

[56] References Cited

U.S. PATENT DOCUMENTS 3,049,852  8/1962  Jacobson .................................. 56/119

FOREIGN PATENT DOCUMENTS 196 27 872 A1  1/1998  Germany ....................... A01D 45/00

*Primary Examiner*—Robert E. Pezzuto
*Assistant Examiner*—Meredith Petravick
*Attorney, Agent, or Firm*—Husch & Eppenberger, LLC; Robert E. Muir

[57] ABSTRACT

A conveying device for stem-bearing crops which is provided with two rotatable circular blades and two rotatable housings above for receiving tines, is to be designed in such a way that the tines are fixed to the rotatable housing in such a way that the risk of breaking is substantially reduced, so that the service life of the tines is substantially increased. The tines are permanently inserted in bearing plates. Each bearing plate is mounted freely rotatably on a fixed bearing pin, the longitudinal center axis of the bearing pin being parallel to and spaced apart from the axis of rotation of the cylindrical housing. On the bearing plate on the outside on two bolts are mounted roller bearings which roll over the control face of a control cam which is also mounted on the bearing pin. The control cam is not rotatable relative to the bearing pin, but slidable in the axial direction, and is pressed by a plate spring assembly toward the roller bearings. As soon as an elevated torque acts on a tine, it is rotated in a direction opposite the direction of rotation, the compressive force of the plate spring assembly being increased, as the roller bearings roll over an ascending oblique surface of the control cam. The forage harvester is particularly suitable for harvesting and chopping fast-growing woody plants.

7 Claims, 5 Drawing Sheets

CONVEYING DEVICE FOR HARVESTING MACHINE

FIELD OF THE INVENTION

This invention relates generally to harvesting machines and more particularly to a conveying device for a harvesting machine.

BACKGROUND OF THE INVENTION

The invention concerns a conveying device in a harvesting machine for harvesting in particular stem-bearing crops such as wood, maize, sugar cane, cereals, grass, rushes and hemp. The embodiment of the invention is described as applied to a forage harvester whose pick-up means are designed for harvesting fast-growing woody plants. This device is equipped with at least two counterrotatable circular blades for cutting down the crop material and a corresponding number of rotatable cylindrical housings which are arranged above the circular blades and which each comprise at least one pick-up element for fixing conveying tines.

With forage harvesters equipped in this way, fast-growing woody plants, such as willow and the like, may be harvested and chopped. The tines fixed to the rotatable housings are necessary so that the crop material, which is for example 3 to 5 m. high, is fed with the cut end in front to the conveying zone of the chopper. For this purpose the rotatable housings are normally driven in the same direction of rotation as the circular blades underneath. The directions of rotation are here selected such that the cut-off crop material is passed through the region between the two tined rotors.

A forage harvester shown in German Patent 196 27 872 A1, has tines bolted to a ring flange which is fixed to a rotatable housing. This housing is driven by a chain drive which, in turn, is driven by an engine. The housing and the tines are at an angle to the horizontal from the front region of the forage harvester. The circular blades underneath are also at an angle to the horizontal, the angle formed with the horizontal being smaller. The distance between the tines and the circular blades is relatively large, so that the cut-off ends of the stems are lifted and transported into the conveying zone. So that the tines can spring relative to the fixed ring flange, they are multiply wound in the fashion of a coil spring adjacent the fixing end. As a result there is a certain resiliency which however is not sufficient to prevent breaking in case of a load increased above the normal load, for example. This sometimes happens when there is an accumulation of crop material. The drive for the tines is reversible, so that in such cases the direction of rotation can be reversed to transport the crop material in the direction opposite the normal direction of flow. After a tine breaks it is necessary to change it, so that the chopper must be stopped temporarily. In spite of the resilient arrangement of the tines the service life is relatively short.

SUMMARY OF THE INVENTION

It is an object of the present invention to overcome the deficiency described above.

It is another object to fix the tines to the rotatable housing in a compact design in such a way that, with sufficient springing, the risk of breaking is substantially reduced, so that the service life of the tines is substantially increased.

In accordance with the present invention, there is provided a mounting arrangement for a tine including a support, a bearing pin having an axis and mounted stationary relative to the support, a bearing plate rotatably mounted on the bearing pin and associated with the tine, at least one moving body on the bearing plate, a control cam supporting the moving body, an energy storing device for loading the control cam, means mounting the energy storing device non-rotatably relative to the bearing bolt and movable only in the axial direction, so that on rotation of the tine the control cam is slidable in the axial direction of the bearing pin against the force of the energy storing device.

Compared with the prior-art design, the inner ends of the tines are no longer wound spirally, but held by the bearing plate. If there is now an increased load on a tine, it can rotate about the longitudinal axis of the bearing bolt, so that there is no build-up of stress peaks, which previously led to breakage. As a result of the energy storing device in combination with the control cam, however, the torque acting on each tine during normal operation is transmitted without major rotation of the tine. Only in case of an elevated torque does the rotary movement occur, which however causes the energy storing device to be tensioned owing to the design of the control cam, i.e. the angle of rotation of each tine depends on the acting torque. The greater the acting torque, the greater the angle of rotation too and the greater the force applied by the energy storing device as well, so that in all positions of the tine the acting torques are removed. The bearing bolt, the energy storing device and the control cam run at the same speed as the cylindrical housing and yet perform no relative movement to the latter. Only at an elevated torque acting on the tines is the control cam displaced by the rolling bodies or sliders in the longitudinal direction of the bearing bolt or in the direction of the axis of rotation of the cylindrical housing.

To avoid tilting moments which prevent the rotary movement of the tines, it is provided that two rolling bodies offset from each other at an angle of 180°, preferably cam rollers or roller bearings, are mounted rotatably on the bearing plate, and that the control face of the control cam which is contacted by the rolling bodies is formed from four oblique surfaces extending over an equal angular distance. In a state of normal operation, the rolling bodies are then supported at the lowermost points of the control cam, which are offset from each other at an angle of 180°. If an elevated torque acts on the tines, the rolling bodies roll over the ascending oblique surfaces, but as the bearing plate is exclusively rotatable, the control cam is displaced against the action of the energy storing device, increasing the distance from the bearing plate. The compressive forces of the energy storing device acting on the rolling bodies are consequently equal in all positions of a tine, so that they cancel each other out. In order for operation to be guaranteed it is provided that the oblique surfaces, seen in the circumferential direction of the control cams, are alternately ascending and descending surfaces with the same angles of descent and ascent. This produces for the control face two lowermost points and two elevated points, which are in each case offset from each other by 180°, one elevated point however being at an angle of 90° to the two lowermost points.

Depending on the kind of crop to be harvested with the forage harvester, it may be necessary for the torques acting on the tines to differ during normal operation. It is therefore provided that the compressive force applied by the energy storing device is variable. Depending on the kind of energy storing device this can be achieved in many ways, as will be described in more detail.

In the simplest design the energy storing device could be a pretensioned compression spring. Since however the applied compressive force depends on the number of turns, a relatively great height is given, which is however undesirable because the forage harvester is also used with a deep snow cover. Components are to be completely prevented from passing into the snow, because snow gets into the conveying zone of the forage harvester as a result. It is therefore provided that the energy storing device functionally associated with each tine is an assembly of plate springs. This ensures that if a relatively small number of plate springs is used, a high compressive force is obtained. The height of the energy storing device is then relatively low. To obtain different compressive forces with such a design, it is provided that the setting of the compressive force is variable by control cams with different angles of descent and ascent of the oblique surfaces of the control face and/or by the number of distance rings. The larger the angle of inclination, the greater the increase in compressive force on rotation of a tine. Due to different thicknesses of the control cam, the assembly formed from the plate springs can be tensioned to a greater or lesser extent, so that the compressive force can already vary in the normal position. This can however also be achieved exclusively by shims which are arranged between an end plate spring and a support.

A structurally simple construction results if each bearing bolt is arranged between two ring flanges arranged parallel and spaced apart on the rotatable housing, and if the region of the bearing bolt protruding from the bearing plates forms a receptacle for the energy storing device. By this means the number of components is reduced. If the energy storing device is a compression spring or an assembly of plate springs, said region of the bearing bolt is located within the energy storing device. With this construction it is then provided that the region of the bearing bolt located between the energy storing device and the bearing plate is designed as a seat for the control cam in such a way that the latter is non-rotatable, but slidable in an axial direction. Such a seat can be obtained in a very simple manner by the fact that the bore of the control cam is designed as an internal tooth system and the bearing bolt comprises a corresponding countertooth system. The length of the countertooth system must however be greater than the thickness of the control cam, so that the axial sliding capacity is ensured. The arrangement of the rolling bodies on the bearing plate can be converted structurally particularly easily if the rolling bodies are mounted rotatably on bolts which are transverse to the longitudinal direction of the bearing bolt and which are inserted in the bearing plate. The bolts can for example be close-tolerance screws with the corresponding seats for the roller bearings. In order that the frictional forces applied by the energy storing device are as low as possible during rotation of a tine, it is provided that to remove the compressive force applied by the energy storing device on the side facing away from the energy storing device the bearing plate is supported on an axial bearing.

These, and other objects and advantages of the present invention, will become apparent as the same becomes better understood from the following detailed description when taken in conjunction with the accompanying drawings.

BRIEF DESCRIPTION OF THE DRAWINGS

Reference is now made more particularly to the drawing which illustrate the best presently known mode of carrying out the invention and wherein similar reference characters indicate the same parts throughout the several views.

DETAILED DESCRIPTION

Figure 1:
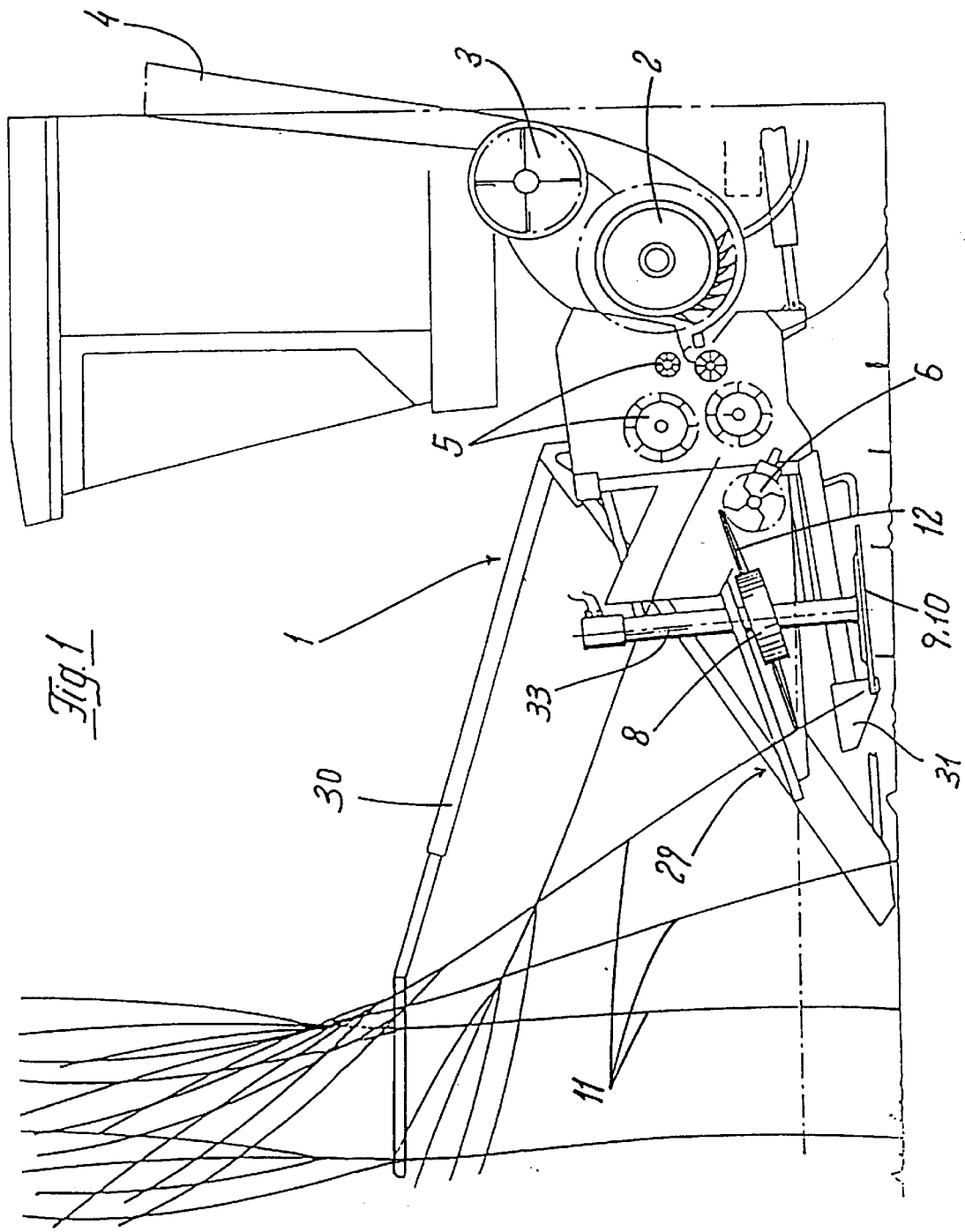
FIG. 1 is a side view of a front part of a forage harvester.
Figure 2:
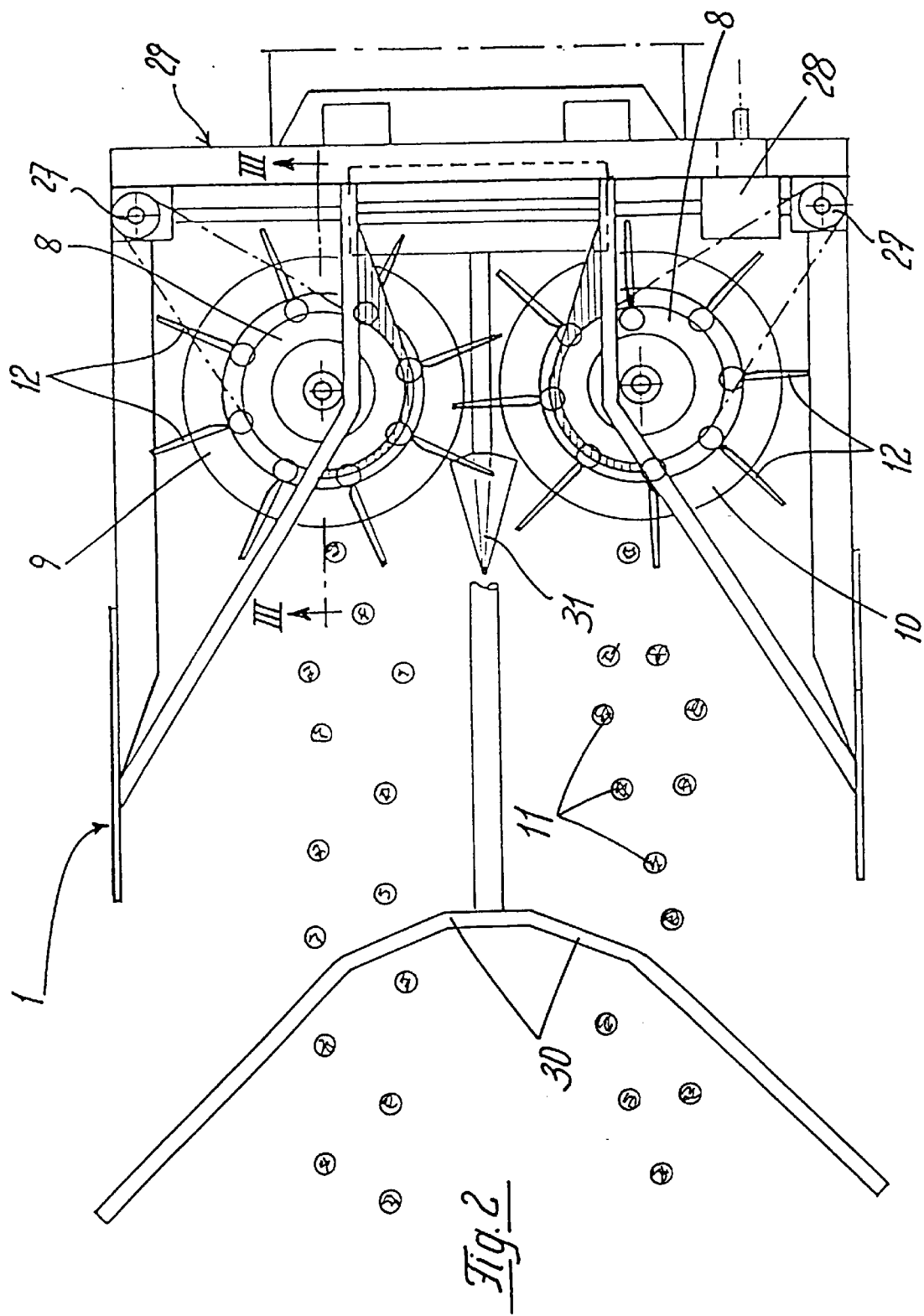
FIG. 2 is a top view of the forage harvester shown partly in FIG. 1.

FIGS. 1 and 2 show the front part 1 of a self-propelled forage harvester which is equipped with a chopper drum 2 and a post-accelerator 3 by which the chopped crop material leaves the forage harvester via the ejector pipe 4, and is fed to an accompanying truck or towed trailer. In front of the chopper drum 2 is a conveying zone formed from pairs of conveying rollers 5. Immediately in front of the conveying zone 5 is a conveying roller 6 which is arranged horizontally and transversely to the direction of travel. This conveying roller 6 rotates directly underneath the plane of rotation of several tines 12 which in a manner which will be described in more detail are mounted rotatably on a rotatable cylindrical housing 9, 10. As seen in the direction of flow of crop material, in front of the conveying roller 6 are arranged two circular blades 9, 10 driven by means of a shaft at a slight angle to the vertical. The angle of inclination from the vertical is selected such that the circular blades 9, 10 are inclined to the front side of the forage harvester. The circular blades 9, 10 are driven in opposite directions, so that the cut-off stems of plants are thrown toward the center.

In order that the cut-offends are transported ahead, above the circular blades 9, 10 rotatable tines 12 are arranged on the cylindrical housing 8. Two spaced-apart parallel ring flanges 13, 14 are bolted to the upper and lower end regions of the housing 8.

In the embodiment shown, between the two ring flanges 13, 14 are arranged eight equiangularly spaced bearing pins 15. The ends of the bearing pins 15 are provided with threaded bores in order to screw them with screws to the ring flanges 13, 14. On the upper region of each bearing pin 15 facing away from the circular blades 9, 10 is a bearing plate 16 mounted for free rotation. This bearing plate 16 is provided on the outer side facing away from the cylindrical housing 8 with a bore which is transverse to the bearing pin 15 and in which the tine 12 is inserted in closing relationship and locked with a pin 17.

Figure 3:
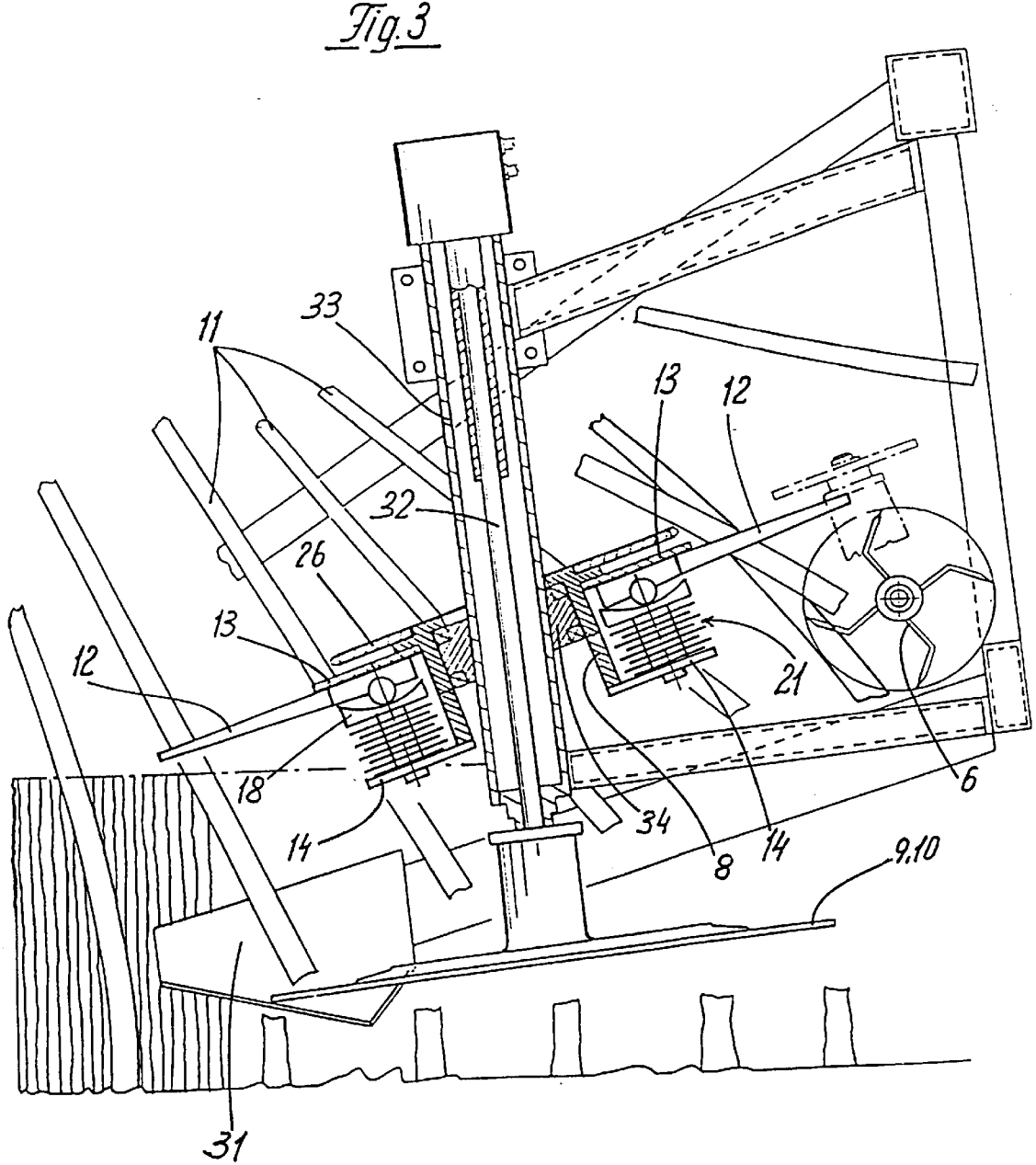
FIG. 3 is a sectional view taken generally along line III—III in FIG. 2.

In the embodiment shown, a control cam 18 is mounted non-rotatably on the bearing pin 15 directly underneath, i.e. on the side facing towards the circular blades 9, 10. The control cam 18 is provided with a bore in the form of an internal tooth system 19. The associated region of the bearing pin 15 is constructed as a corresponding countertooth system 20, so that the control cam 18 is slidable in the axial direction of the bearing pin 15. The lower region of the bearing pin 15 facing towards the circular blades 9, 10 is larger in diameter than the region which receives the tine 12. The lower region is surrounded by an energy storing device, advantageously in the form of a plate spring assembly 21. This plate spring assembly 21 is supported by one end on the ring flange 14 and by the other end on the control cam 18. On the bearing plate 16 are inserted two bolts 22,23 which are offset from each other at an angle of 180° and which are transverse to the bearing pin 15 and project from the outer surface of the bearing plate 16. On the projecting region are mounted two roller bearings 24, 25 which roll over the control face of the control cam 18. The control face of the control cam 18 consists of four oblique surfaces which ascend and descend alternately in the circumferential direction, the angles of inclination being equal. Consequently the control face of the control cam 18 has two low and two elevated regions which are in each case offset from each other at 180°, so that one low region is offset from the higher region at an angle of 90°. The cylindrical housing 8 is bolted to a sprocket 26 which is located on the side facing away from the plate spring assembly 21. The sprocket 26 and hence the cylindrical housing 8 is driven by means of a roller chain, not shown, by a further sprocket 27 which is driven by an angular gear mechanism 28. In particular FIGS. 1 and 3 show that the axes of rotation of the circular blades 9, 10 form an acute angle with the axes of rotation of the cylindrical housings 8 such that the path of rotation of the tines 12 is at a greater angle to the vertical than that of the circular blades 9, 10.

Figure 4:
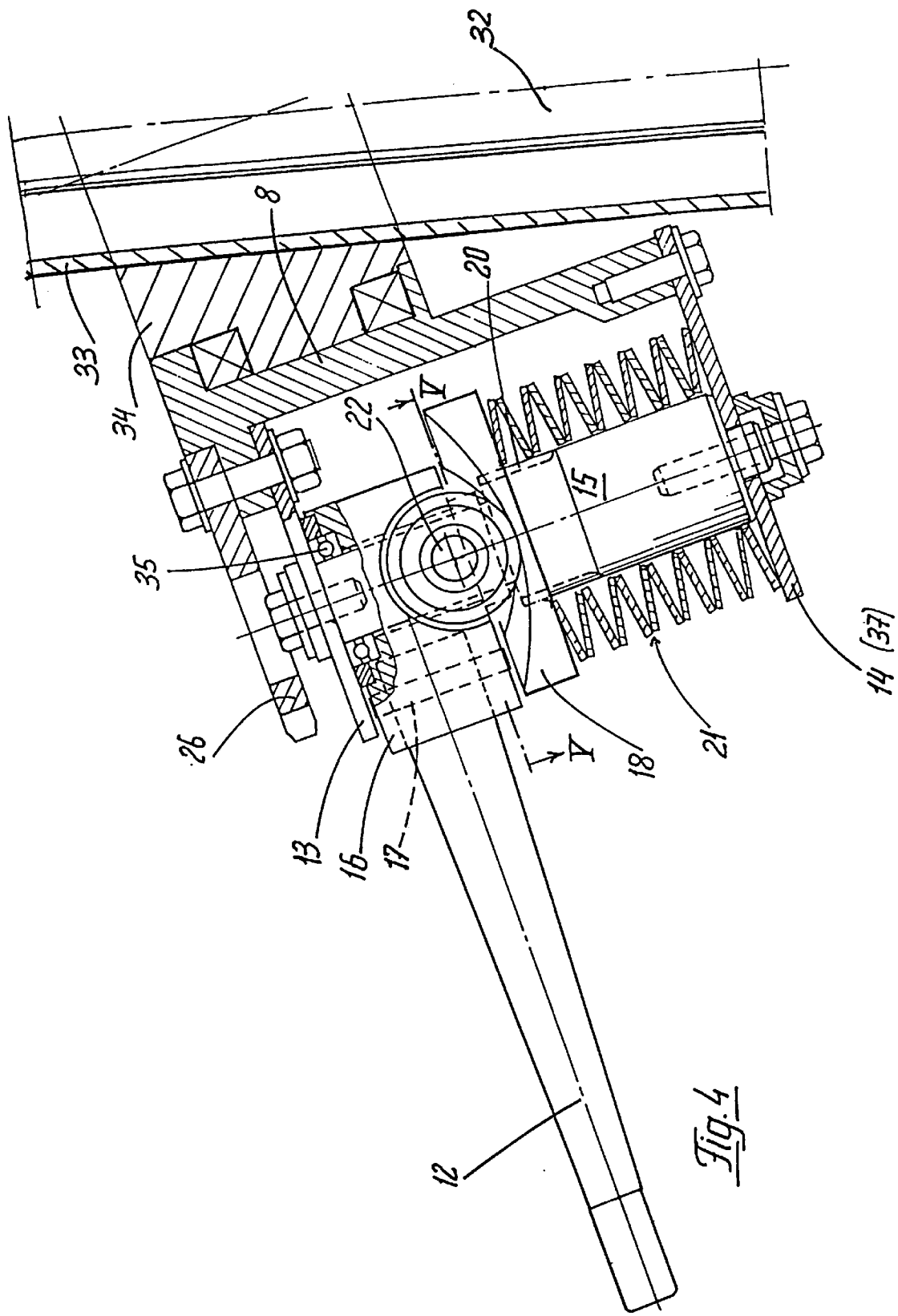
FIG. 4 is an enlarged detail view of the tine mounting shown in FIG. 3.

FIG. 4 shows that the control cam 18 and the plate spring assembly 21 may also be located on the opposite side of each tine 12. In FIG. 4 the rotatable housing 8 is mounted by means of roller bearings in relation to fixed components of the forage harvester.

FIGS. 1 and 2 show that the front part 1 of the forage harvester is equipped with an attachment 29 which comprises a hold-down device 30 for pressing forwards the stems to be cut down at a relatively long distance from the base, so that transport with the cut-offend in front is favoured. In FIG. 2 the hold-down device 30 is of arcuate construction, so that the cut-off portions of the stems 11 pass to the centre. In the middle between and directly above the circular blades 9, 10 the front part 1 is also provided with a separating wedge 31. FIG. 3 shows that each circular blade 9, 10 is driven by means of a shaft 32 which is passed through a stationary tube 33 which is at an oblique angle to the axis of rotation of the cylindrical housing 8. For mounting this cylindrical housing 8, on the tube 33 is permanently mounted a cylindrical disc 34 which however comprises an oblique bore according to the tilt. The compressive force applied by the plate spring assembly 21 is removed on the opposite side by an axial bearing 35 which is located between the bearing plate 16 and the upper ring flange 13.

Figure 5:
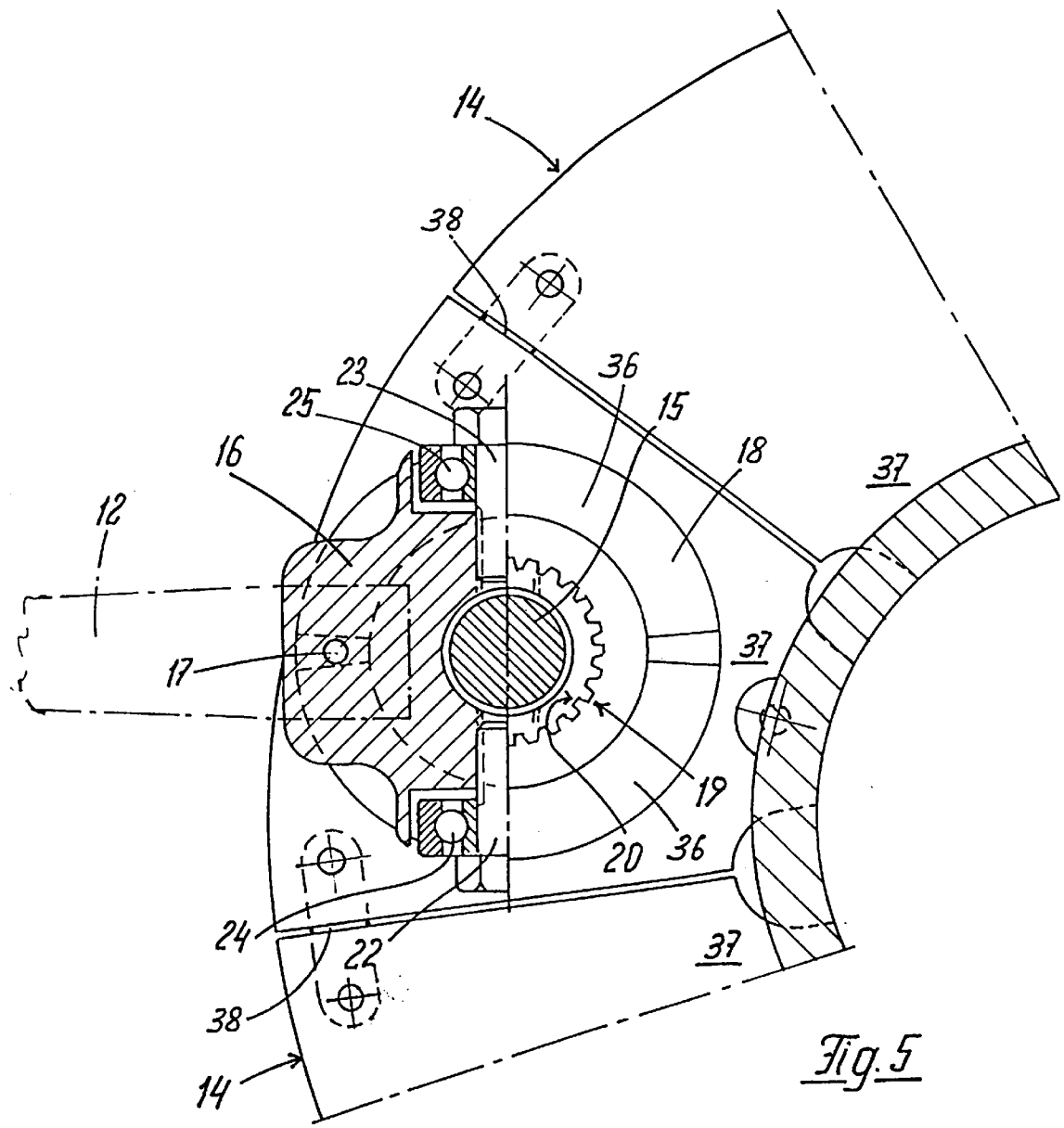
FIG. 5 is a sectional view taken along line V—V in FIG. 4.

FIG. 5 best illustrates the internal tooth system 19 of the control cam 18 and that the control face 36 is advantageously an annular surface which surrounds the as external tooth system 19. The lower ring flange 14 is composed of several segments 37 which on the one hand are releasably connected to each other by connecting strips 38 and on the other hand are screwed to the housing 8. This makes it possible by removal of a segment 37 for the energy storing device 21 to become accessible in order for example to exchange it for one with a different spring characteristic or to tension it more by adding shims or to relax it by the removal of distance rings.

The invention is not confined to the embodiment shown nor to the application, for example, forage harvesters. More important is the rotatable arrangement of the tines 12 relative to the cylindrical housing 8; the two axes of rotation being parallel to and spaced apart from each other. Also advantageous is the fact that on rotation of a tine 12, the control cam 18 with increasing pivot angle causes an increase in the torque.

During operation of the forage harvester the circular blade 10 on the left in the direction of travel is driven clockwise and the circular blade 9 on the right in the direction of travel is driven anticlockwise. In the same direction of rotation the two cylindrical housings 8 bearing the tines 12 are also driven via the sprockets 26. During normal operation there is no relative movement between the tines 12, the roller bearings 24, 25, the bearing plate 16 and the control cam 18.

These said forward parts are driven at the same speed as the cylindrical housing 8. The two roller bearings 24, 25 are then at the two lowermost points of the control face of the control cam 18. If however an elevated torque acts on one of the tines 12, it is pivoted in a direction opposite the direction of rotation, as a result of which the bearing plate 16 rotates on the bearing pin 15. The two roller bearings 24, 25 then as a result roll over the ascending oblique surfaces of the control cam 18, moving the latter downwards and subjecting the energy storing device or the plate spring assembly 21 to more tension. As soon as the elevated torque is reduced again, the respective tine 12 moves back to the original normal position.

While a preferred embodiment of the invention has herein been illustrated and described, this has been done by way of illustration and not limitation, ad the invention should not be limited except as required by the scope of the appended claims.

We claim:

1. In a conveying device in a harvesting machine for harvesting in particular stem-bearing crops, with rotatable cylindrical housings including at least one pick-up element for fixing a radially projecting conveying tine which has an inner end at the cylindrical housing; the improvement comprising:

a bearing pin having an axis parallel to the cylindrical housing and mounted stationary relative to the cylindrical housing, a bearing plate rotatably mounted on the bearing pin and associated with a tine, at least one moving body on the bearing plate, a control cam supporting the moving body, an energy storing device for loading the control cam, the energy storing device being non-rotatably mounted relative to the bearing pin and movable only in the axial direction, so that on rotation of the tine the control cam is slidable in the axial direction of the bearing bolt against the force of the energy storing device.

2. A conveying device according to claim 1 wherein each moving body is a rolling body.

3. A conveying device according to claim 2, wherein there are two rolling bodies offset from each other at an angle of 180° and mounted rotatably on the bearing plate, and in that a control face of the control cam which contacts the rolling bodies is formed from four oblique surfaces extending over an equal angular distance.

4. A conveying device according to claim 3, wherein the rolling bodies are cam rollers.

5. A conveying device according to claim 3, wherein the rolling bodies are roller bearings.

6. A conveying device according to claim 3, wherein the oblique surfaces, seen in the circumferential direction of the control face, are alternately ascending and descending surfaces with the same angles of descent and ascent.

7. A mounting arrangement for a tine including a support, a bearing pin having an axis and mounted stationary relative to the support, a bearing plate rotatably mounted on the bearing pin and associated with the tine, at least one moving body on the bearing plate, a control cam supporting the moving body, an energy storing device for loading the control cam, means mounting the energy storing device non-rotatably relative to the bearing bolt and movable only in the axial direction, so that on rotation of the tine the control cam is slidable in the axial direction of the bearing pin against the force of the energy storing device.

\* \* \* \* \*